United States Patent [19]

Steiner

[11] Patent Number: 5,713,697
[45] Date of Patent: Feb. 3, 1998

[54] OIL-EXTRACTION STATION

[75] Inventor: Walter Georg Steiner, Frankfurt, Germany

[73] Assignee: Water Pollution Control System B.V., Etten-Leur, Netherlands

[21] Appl. No.: 495,479

[22] PCT Filed: Jan. 26, 1994

[86] PCT No.: PCT/DE94/00066

§ 371 Date: Jul. 24, 1995

§ 102(e) Date: Jul. 24, 1995

[87] PCT Pub. No.: WO94/17250

PCT Pub. Date: Aug. 4, 1994

[30] Foreign Application Priority Data

Jan. 26, 1993 [DE] Germany .......... 43 02 048.8
Nov. 2, 1993 [DE] Germany .......... 43 36 963.4

[51] Int. Cl.⁶ .......................................... E02B 15/04
[52] U.S. Cl. .......................... 405/60; 405/63; 210/242.3; 210/922
[58] Field of Search .................. 405/60, 66, 63; 210/242.1, 242.3, 242.4, 922, 923

[56] References Cited

FOREIGN PATENT DOCUMENTS

| | | |
|---|---|---|
| 606698 | 7/1994 | European Pat. Off. .......... 405/60 |
| 1 564 195 | 4/1969 | France . |
| 2 069 926 | 9/1971 | France . |
| 2 410 093 | 6/1979 | France . |
| 2 673 214 | 8/1992 | France . |
| 2348344 | 4/1975 | Germany .......... 405/60 |
| 27 21 108 | 11/1978 | Germany . |
| 2947281 | 5/1981 | Germany .......... 405/60 |
| 1108167 | 8/1984 | U.S.S.R. .......... 405/60 |
| 1 207 154 | 9/1970 | United Kingdom . |
| 1 549 343 | 8/1979 | United Kingdom . |
| 2044625 | 10/1980 | United Kingdom .......... 405/60 |

*Primary Examiner*—Tamara L. Graysay
*Assistant Examiner*—Frederick L. Lagman
*Attorney, Agent, or Firm*—Spencer & Frank

[57] ABSTRACT

An apparatus for collecting floatable liquids such as oil and gasoline, in particular in the case of oil-contaminated or gasoline-contaminated water surfaces. The apparatus includes a collecting container which is vat-like or cylindrical and which is immersed into the water surface; an annular float on which the collecting container is at least partly borne in its upper region; an inlet opening for the liquid which is to be collected and arranged directly beneath the float; at least one delivery pump for transporting the liquid in the collecting container to a disposal station, the float having a buoyancy arrangement such that the float substantially rests on the water surface; a funnel-like intake trough which encloses the collecting container and is located beneath the float, the trough forming, along with the float, a defined intake gap which corresponds to the width of the liquid stream which is to be taken in, the intake gap between the underside of the float and the upper side of the intake trough being variable in its width and being less than or equal to 300 mm.

16 Claims, 4 Drawing Sheets

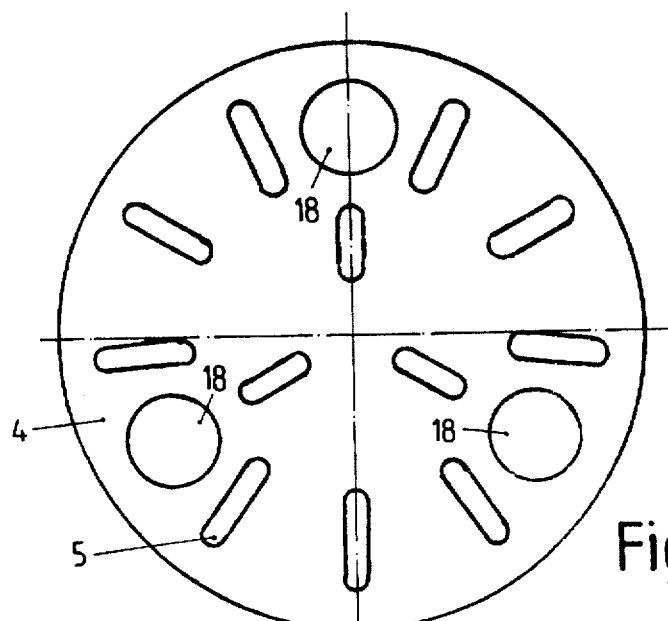
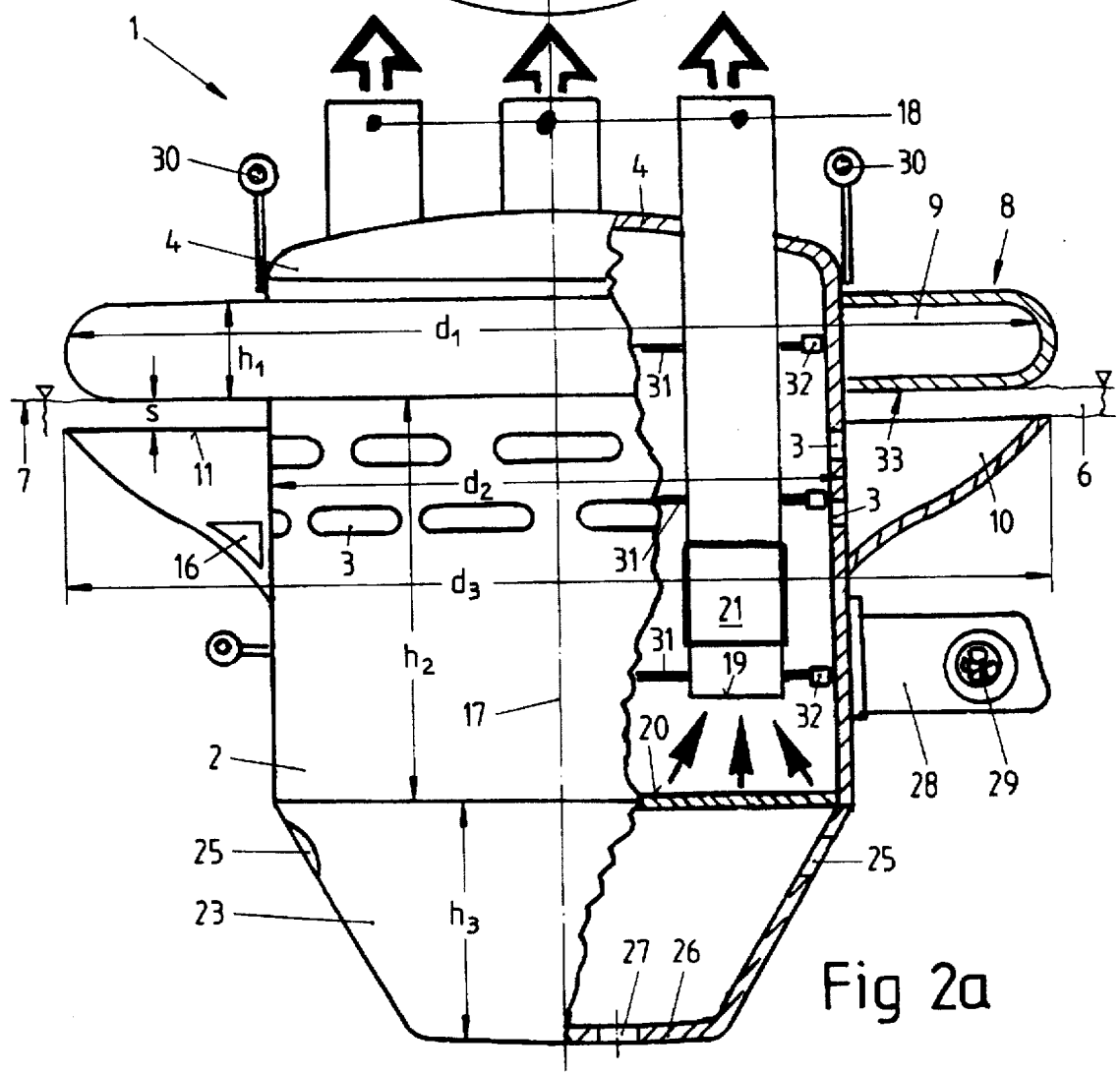
Fig 2b
Fig 2a

OIL-EXTRACTION STATION

FIELD OF THE INVENTION

The invention relates to an apparatus for collecting floatable liquids such as oil, gasoline or the like, in particular in the case of oil-contaminated or gasoline-contaminated water surfaces.

BACKGROUND OF THE INVENTION

In the event of accidents involving ships and, in particular, tanker disasters, large quantities of oil can escape and form an oil slick or oil-contaminated sea water on the water surface. All previous measures to extract such oil slicks or oil-contaminated sea water from the water surface have tended to have little effect. For example, it has been the case that the oil slick or the oil-contaminated sea water has been contained by floating barriers, in order then to extract said oil slick or sea water from the water surface. This is only possible when the sea is calm, the extraction volume generally not corresponding to the required quantity. High seas force the oil slick or the oil-contaminated sea water over such floating barriers.

It has also turned out to be the case that the use of chemicals is not very efficient due to the aggravating odor and other resulting phenomena, such as the oil mixture sinking onto the sea bed.

FR 2 673 214 A1 discloses an installation for collecting oil slicks, the oil slicks being extracted in large volumes below the water level by means of an oil-extraction station comprising a plurality of assemblies and units. In a particular embodiment of the generic type from this document (FR 2 673 214, FIG. 7), provision is made for an oil-collecting container which floats in the water and exhibits, on its upper wall sections, a float resting on the water surface. The oil layer floating on the water is guided laterally beneath the float and enters, through openings in the wall sections, into a collecting container. The collecting container itself is connected to a suction line which extracts the liquid which has been received in the collecting container downwards out of said container and leads, via lines, to a ship's boat or the like. This installation has the advantage that the more or less thick oil layer is always collected beneath the float and fed to the oil-collecting container. The buoyancy of the oil-collecting container itself and the inflow surface, for the liquid which is to be taken in, in the collecting container determine the measure or the quantity of the liquid received. In the case of this installation, accordingly, separation of the oil layer from the rest of the water surface can only be carried out with difficulty, which may possibly result in the intake of large quantities of water which is only contaminated to a small extent, and thus impair the efficiency of the installation.

A further installation for absorbing oil slicks is known, for example, from DE 27 21 108 A1. In this extremely large-volume installation, there is located, in the center of a scaffolding structure which has been rendered floatable, a frustoconical housing with lateral inlet openings for receiving the oil-contaminated surface water. Here too, the penetration depth of the inflow openings follows the measure of the immersion depth of the floats located on the outer scaffolding ends. A receiving clearance of defined thickness for an oil slick cannot be adjusted.

See also French Patent Specification FR 24 10 093, which discloses an oil-extraction station which is constructed, in pot form, as a float. In the case of this apparatus, the oil slick is received on the upper side of the floating apparatus via inflow slots. The correct floating position and immersion depth of such an apparatus are accordingly determined by the measure of the oil passing under the upper side.

SUMMARY OF THE INVENTION

The object of the invention is to provide an oil-extraction apparatus which makes it possible for an oil slick or oil-contaminated sea water to be collected in a very specific and thus efficient manner. In this arrangement, the installation is to be designed such that it can collect an oil slick or oil-contaminated water over a large area, with the result that it can be used after tanker disasters in docks, coastal areas, on open seas or land-locked seas or other waters, it also being possible for leaking drilling platforms or damaged oil-supply lines to be treated in a corresponding manner.

The essence of the invention is that the oil-extraction station comprises a float which, to the greatest extent, rests on the water surface and does not penetrate into the water surface, or penetrates only slightly into the water surface, with the result that the oil layer floating on the water surface can, in practice, pass beneath said float. Accordingly, the oil-extraction station, as a result of its volume and as a result of further buoyancy measures, has such an immersion depth that the upper float resting on the water surface forms a type of upper limit for the oil slick which is to be received. The lower limit of the oil slick which is to be received is formed by an additionally provided intake trough, with the result that float and intake trough form a mouth-like opening for the oil layer or the oil slick which is to be received. In this arrangement, the inflow width of said receiving opening is variable, depending on the application.

This measure can result in the oil slick being received by the oil-extraction station in a very specific and thus efficient manner, which oil slick is then directed into a collecting container contained within the oil-extraction station. From there, the oil which has been collected can be transported by means of pumps and extraction lines into an adjacent bunkering boat.

BRIEF DESCRIPTION OF THE DRAWINGS

Further advantages and details of the invention are explained in more detail in the exemplary embodiments described hereinbelow and can be gathered from the drawings, in which:

FIG. 2a shows a schematic representation of the oil-extraction station according to FIG. 1, partly in section, FIG. 2b shows a plan view of the upper region of the station according to FIG. 2a, FIG. 3 shows a side view of the schematic representation of a further exemplary embodiment.

DETAILED DESCRIPTION OF THE INVENTION

Figure 1:
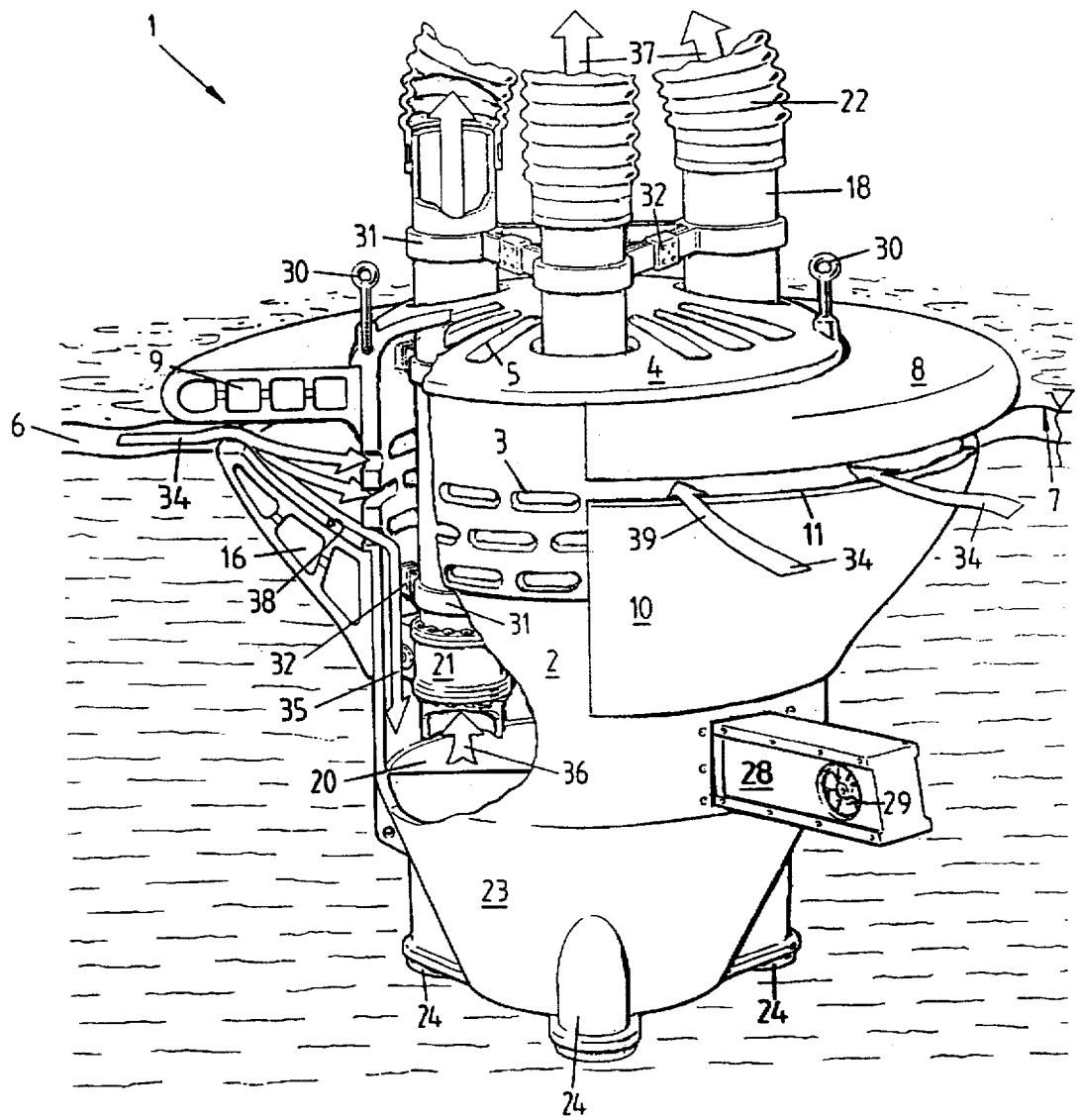
FIG. 1 shows a perspective view of an oil-extraction station, partly in section.

According to the perspective view in FIG. 1 and the side view in FIG. 2a, the oil-extraction station 1 according to the invention comprises a cylindrical basic body 2 with a large number of inflow openings 3 which are contained in the upper outer surface of said basic body 2 and are designed as horizontal longitudinal slots or circular bores. A chambered or dome-shaped covering cupola 4 closes off the upper part of the cylindrical basic body 2 and exhibits likewise slot-shaped inflow openings 5 which run radially outwards (cf. FIG. 2b). The cylindrical basic body 2 serves as a collecting container 2 for an oil slick 6, on the water surface 7, which is to be disposed of. In its upper region, the oil-collecting container 2 is surrounded by an annular float 8 which is optionally divided into ring segments and exhibits a multiplicity of air ducts 9 in its interior. The air ducts 9 serve as buoyancy chambers and, if appropriate, are configured such that the float 8 rests essentially on the water surface 7 in the manner of a lifebelt. The air ducts 9 may be configured to be inflatable. They may also be filled with other buoyancy means. As can be seen from FIG. 1, the air ducts 9 may comprise a plurality of annular individual chambers which may be filled with air or another buoyancy means to a greater or lesser extent.

The external diameter $d_1$ of the float is $d_1 \approx 7$ m. The external diameter of the collecting container is $d_2 \approx 3$ m, and its height is, for example $h_2 \approx 2.5$ m. The height of the float 8 is $h_1 \approx 0.5$ m.

Figure 3:
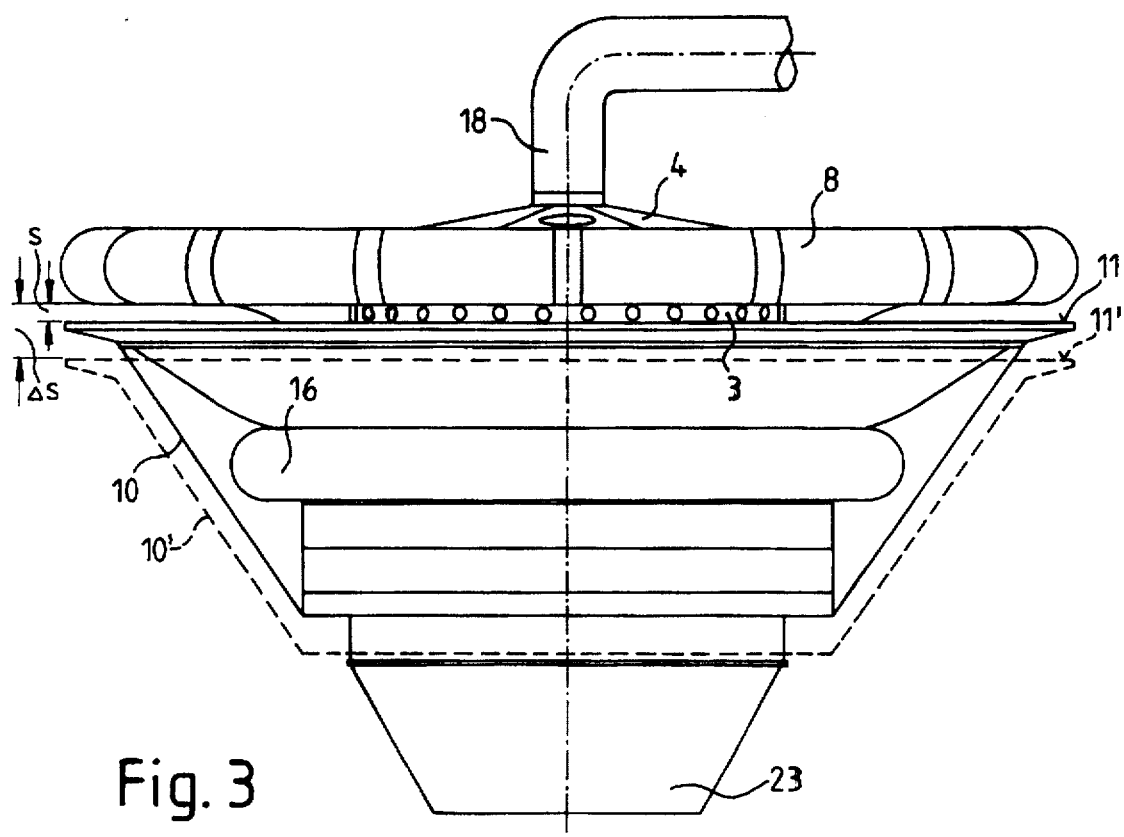

Located just beneath the float 8 is a parabolic intake trough 10, of which the upper border 11 is arranged at a defined distance s beneath the float. As can be seen from FIGS. 3 and 4, said gap S can be varied in size, for which purpose use is made of a height-adjustment device 12. The maximum lifting adjustment is represented in FIG. 3 by $\Delta s$ and is $\Delta s \approx 250$ to 300 mm. The bottom position of the intake trough is designated by 10'.

The height-adjustment device 12 comprises a threaded spindle 13 and a spindle nut 14. The threaded spindle 13 is driven by a drive motor 15 (see FIG. 4).

Figure 4:
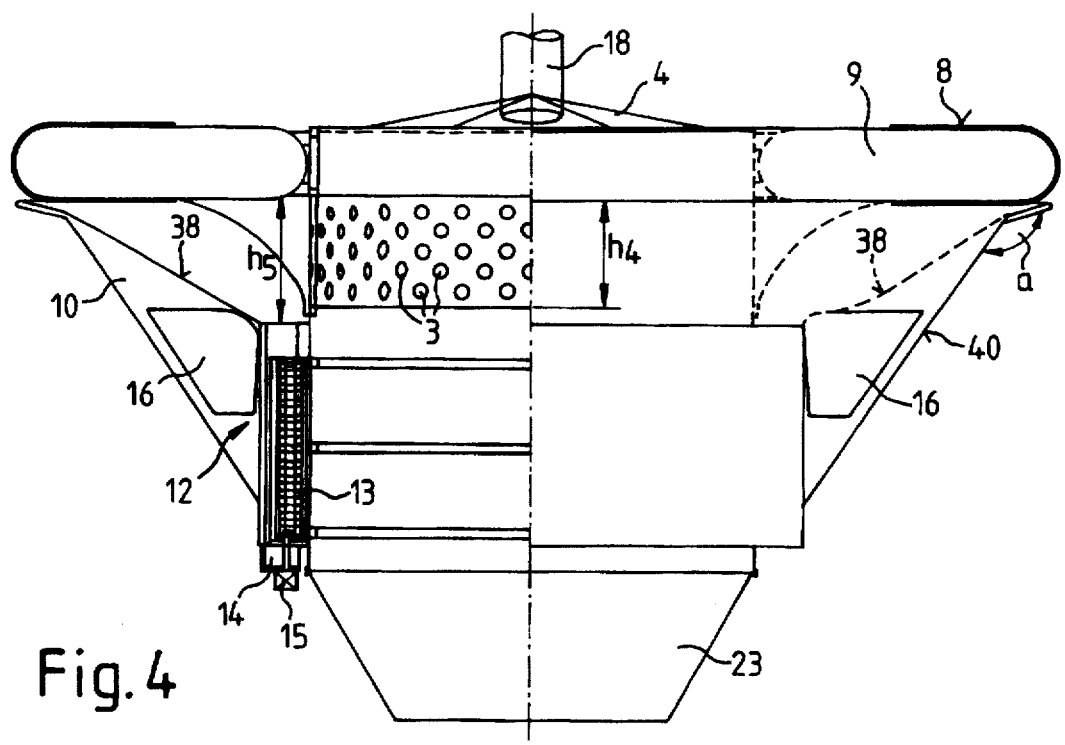
FIG. 4 shows a side view, half in longitudinal section in order to represent further details.

From FIGS. 1, 4 it can, furthermore, be seen that the intake trough 10 likewise exhibits buoyancy bodies 16 which are designed, for example, as air cushions and, if appropriate, are variable in their volume.

Opening into the oil-collecting container 2 are three extraction pipes 18 which are arranged symmetrically about the center axis of symmetry 17 and reach, with their lower end 19, approximately as far as the closed base 20 of the oil-collecting container 2. High-capacity pressure pumps 21 are integrated into the extraction pipes 18, which pumps serve for the delivery of the oil or of the oil-contaminated liquid collected in the oil-collecting container 2. In the upper region, the extraction pipes 18 project through the covering cupola 4 (cf. FIGS. 1 to 2b) and exhibit, in their upper region, flexible hoses 22 which serve for the flexible connection to further pipelines to a bunkering boat.

Located beneath the closed base 20 of the oil-collecting container 2 is a stabilizer 23 with positioning feet 24. In its upper wall section, the stabilizer exhibits a plurality of infeed bores 25 through which water can penetrate. Equally, its base 26 contains further infeed bores 27 through which water can flow in. The cross-sectionally frustoconical stabilizer 23 is, accordingly, flooded with water and, when the sea is rough, behaves in a manner similar to a downwardly projecting center board. Consequently, the movements of the oil-extraction station are stabilized in rough seas.

Located in the lower region of the cylindrical collecting container 2 is a rudder blade 28 with a cross-rudder screw 29 which serves to stabilize the position of the oil-extraction station.

The oil-extraction station 1 can be transported and fixed in position by transporting and securing eyelets 30.

The extraction pipes 18 are retained in the interior of the collecting container 2 by fastening webs 31 which are fitted with additional vibration dampers 32. Fastening webs 31 with vibration dampers 32 for the three symmetrically arranged extraction pipes 18 are also located above the covering cupola 4. However, the fastening to an inner wall, as is present within the container, is not provided here.

Accordingly, the oil-extraction station 1 according to the invention serves for the large-area and large-volume absorption of oil slicks and oil-contaminated fresh water or sea water beneath the water surface. In this arrangement, the installation is produced in a compact manner and is made up of assemblies, units and auxiliary functional units which are resistant to sea water, acid and fire. In this arrangement, the cylindrical collecting container 2 forms the foundation of the installation and, in accordance with its height $h_2 \approx 2$ to 4 m and its diameter $d_2 \approx 3$ m, receives a large quantity of the oil slick which is to be absorbed. The floating of the oil-extraction station is ensured by the individual buoyancy bodies 9, 16 and by the volume of the collecting container 2 which remains free, the intention being for the float 8 to rest essentially on the water surface in order to form the defined inflow gap s between the float 8 and the intake trough 10. The external diameter $d_3$ of the intake trough 10 corresponds approximately to the external diameter $d_1$ of the float 8 (cf. FIG. 2a). However, according to the representation of FIG. 1, it may also be of a somewhat smaller design.

For use, the oil-extraction station is aligned in the water such that the oil slick 6 is always located level with the lower edge 33 of the float 8, i.e. the water surface 7, as it were, forms the lower edge 33 of the float 8. The upper edge or the upper border 11 of the intake trough 10 is adjusted by means of the height-adjustment device 12 such that the gap s corresponds approximately to the thickness of the oil slick 6. In this manner, the oil floating on the water is removed in a very specific manner. The inflow of the oil slick 6 into the inflow gap 39 is identified in FIG. 1 by arrows 34, the gap permitting the oil slick to flow through the inflow openings 3 into the interior of the container (arrow 35). The oil running into the oil-collecting container 2 is transported, in accordance with the arrow 36, by way of the extraction pipe 18 into an associated bunkering boat (arrow 37).

The frustoconical stabilizer (23) has a height $h_3 \approx 1$ m. It prevents the oil-extraction station from capsizing, even in high seas, and provides the entire installation with a stable position adapted to the respective sea conditions.

The upper covering cupola 4 with its inflow openings 5 makes it possible for oil to be received when waves are breaking over it, with the result that, in this manner too, oil or contaminated water can flow into the installation.

According to the representation of the oil-extraction station according to the invention shown in FIGS. 3 and 4, the inflow openings 3 provided in the oil-collecting container 2 may be designed in the form of slots or as bores. They are provided over a height region $h_4$, which corresponds approximately to the maximum inner height region $h_5$ of the intake trough 10. Accordingly, the inner wall section 38 of the intake trough 10 tapers in the form of a funnel to height $h_5$, at which the inflow openings 3 are provided. The inflow openings 3 prevent foreign bodies such as driftwood or the like from penetrating into the interior of the oil-collecting container 2.

The height-adjustable parabolic intake trough 10 increases the suction action aimed at the oil slick 6 which is to be received. In particular due to the adjustable gap width s, specifically only such liquid as is contaminated with oil is taken in. The parabolic intake trough 10 is adjusted via roller-mounted prism guides and, in particular, via the adjustment device 12.

The upper edge 11 of the parabolic, adjustable intake trough 10 is always located beneath the water surface 7, with the result that the oil slick 6 is forced to flow through the resulting inflow opening 39 into the oil-extraction station. This results in the installation being force-filled. Additional flooding valves may be used in order to fill the installation. If the oil-extraction station is filled with oil, the pumps 21 are put into operation. The high delivery capacity of the low-lying high-capacity pressure pumps 21 results in a high suction action in the oil-extraction station.

The rudder blade 28 and the cross-rudder screw 29 prevent the oil-extraction station from turning about its own axis in stationary operation or when being towed. The cross-rudder screw 29 may be coupled to a navigation system and controlled remotely or operated manually.

As can be seen from FIG. 4, the upper, outer border of the intake trough 10 may be designed to be bent off slightly at an angle of α≈140° with respect to the outer cone surface. This forms a type of "plate border" which makes it possible specifically for the oil layer to be received.

Figure 5:
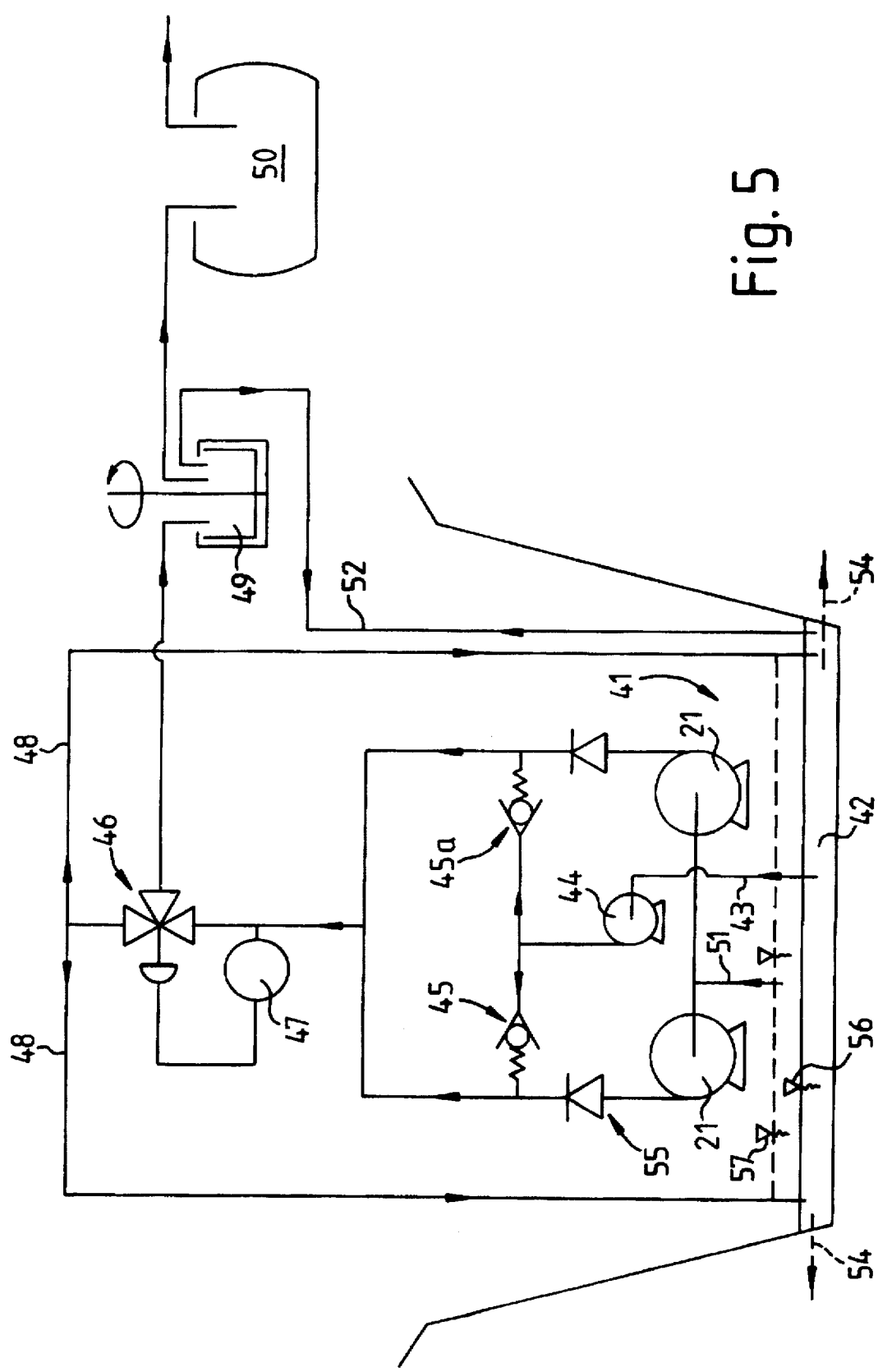
FIG. 5 shows a connection diagram for the activation of the high-capacity pressure pumps.

The pumping operation of the water/oil mixture is a continuous process as long as the cleaning operation is taking place. For this purpose, FIG. 5 shows a connection diagram of the actuation of the high-capacity pumping system.

When the installation is started up, the latter is merely activated by water in a first operation phase (arrow 41), the water 41 being fed from the lower base 42 of the installation via a delivery line 43 to a high-pressure pump 44. Said high-pressure pump 44 produces a constant pressure on the two non-return valves 45, 45a. This prevents the high-capacity pressure pumps 21 from drying out. The high-capacity pressure pumps 21, designed as centrifugal pumps, may be driven hydraulically, electrically or pneumatically.

The first amount of water is pumped back into circulation in the installation. For this purpose, provision is made for a three-way valve 46 which is regulated by a control member 47. The control member measures the density of the medium and controls the three-way valve 46.

As soon as the control member 47 registers taken-in water, the three-way valve is switched such that said water is pumped via lines 48, back to the base 42 of the installation, said base 42 being located within the container some way beneath the contamination surface 57 of the oil (water surface: cf. reference numeral 56).

As soon as the control member 47 registers oil, the three-way valve 46 is, in a second operation phase, switched over and the contaminated oil is pumped, via a separator system 49 designed, if appropriate, as a centrifuge, into a collecting container 50, e.g. a tanker, collecting tank or the like. The control system 47, for differentiating water and oil in conjunction with the separating device, ensures that, as far as possible, optimum separation of oil and water which have been taken in is carried out, with the result that, as far as possible, only taken-in oil is disposed of.

Accordingly, the high-capacity pressure pumps 21 essentially only extract, via the line 51, top-floating oil, the intention being to dispose of this oil. The water located beneath can be disposed of via the additional high-pressure pump 44. Excess water can be pumped to the outside by the installation via the lines 54. Shut-off valves 55 determine the flow direction through the high-pressure pumps 21.

In FIG. 5, a further line 52 is led from the separator system 49 to the base 42 of the installation in order to pump back excess water.

The oil-extraction station according to the invention is not restricted to the exemplary embodiment which has been represented and described. Rather, it also encompasses all specialist developments within the scope of the idea according to the invention.

What is claimed is:

1. An apparatus for collecting floatable liquids such as oil and gasoline, in particular in the case of oil-contaminated or gasoline-contaminated water surfaces, the apparatus comprising a collecting container which is at least one of vat-like and cylindrical and which is immersed into the water surface; an annular float on which said collecting container is at least partly borne in its upper region; an inlet opening for the liquid which is to be collected and arranged directly beneath said float; at least one delivery pump for transporting the liquid in the collecting container to a disposal station, said float having buoyancy means such that said float substantially rests on the water surface; a funnel-like intake trough which encloses said collecting container and is located beneath said float, said trough forming, along with the float, a defined intake gap which corresponds to the width of the liquid stream which is to be taken in, said intake gap between the underside of the float and the upper side of the intake trough being variable in its width and being less than or equal to 300 mm.

2. The apparatus as defined in claim 1, wherein at least one of said collecting container, said float and said funnel-like intake trough is rotationally symmetrical.

3. The apparatus as defined in claim 1, wherein said float is an annular, disk-like floating ring which, in its interior, has at least one more buoyancy chamber of variable volume, said floating ring being divided into a plurality of separate floating segments.

4. The apparatus as defined in claim 3, wherein the inner ring region of the float is covered by a covering plate having inlet openings which lead to said collecting container.

5. The apparatus as defined in claim 1, further comprising at least one vertical extraction pipe which opens into said collecting container and leads to the outside through an upper covering plate, said extraction pipe having a flexible connection element for connection of a further connection pipe.

6. The apparatus as defined in claim 5, comprising at least three vertical extracting pipes which are arranged symmetrically.

7. The apparatus as defined in claim 5, wherein said extraction pipe has a high-capacity pressure pump in its lower region.

8. The apparatus as defined in claim 1, wherein said trough is positioned on said collecting container, approximately halfway up the latter, and, with its inner wall, leads in the form of a funnel from the outer surface of the collecting container to the underside of said float.

9. The apparatus as defined in claim 8, wherein the upper border of the intake trough encloses, with its outer cone surface, an obtuse angle α of 140°.

10. The apparatus as defined in claim 1, wherein said intake trough has a height-adjustment device having a threaded spindle with motor drive as well as a spindle nut.

11. The apparatus as defined in claim 10, wherein said intake trough is a hollow body having further buoyancy bodies.

12. The apparatus as defined in claim 1, further comprising, beneath said collecting container, a cylindrical cavity serving as a stabilizer which has at least one of lateral and bottom inlet openings.

13. The apparatus as defined in claim 1, wherein the outer surface of one of said collecting container and said stabilizer comprises a rudder device.

14. The apparatus as defined in claim 13, wherein said rudder device has a drive screw.

15. The apparatus as defined in claim 14, wherein said drive screw is a separate cross-rudder screw.

16. The apparatus as defined in claim 14, wherein said drive screw is an additional cross-rudder screw.

* * * * *